Patented Dec. 31, 1935

2,025,986

UNITED STATES PATENT OFFICE 2,025,986

IMPROVED CONFECTION

Benjamin R. Harris, Chicago, Ill.

No Drawing. Application April 3, 1935,
Serial No. 14,528

23 Claims. (Cl. 99—16)

My invention relates to confections and methods of producing the same, and is a continuation in part of my co-pending application, Serial No. 710,893, filed February 12, 1934.

In my co-pending application, of which the present application is a continuation in part, I describe the use of esters of phosphoric acid formed by reacting a lipophile material having at least one free hydroxy group with a derivative of phosphorus capable of forming an ester thereof, in certain types of confections to secure certain advantages and improvements therein.

The reaction product of the lipophile material and the derivative of phosphorus preferably is neutralized, but it may be employed in an unneutralized condition.

The type of confection to which the invention relates is that wherein a comminuted material such as cocoa powder, powdered milk, sugar or the like is combined with a fat. Examples of confections of this type are chocolate, chocolate-like coatings for candy, coatings for ice cream and cookies and other confections such as toffees, caramels, icings, fillings, fudges, butter creams, and other compositions of the same general class. In each of these types of confections, a comminuted material including sugar and/or other similar substances such as cocoa powder, dried egg material, powdered milk, and the like, are dispersed in the fat, or otherwise combined with the fat.

Generally my present invention is in the nature of an improvement over the process and product described in my prior patent by means of which very much improved results are obtained, particularly in the reduction of viscosity of chocolate. Other advantages and improvements also flow from the new features incorporated in the process and product in addition to viscosity reduction. In general, I proceed in the same manner described in my prior application with the exception that a pretreatment step is employed prior to the formation of the phosphoric acid ester, the nature and effect of which will be pointed out more in detail hereinafter. For the convenience of those skilled in the art, I shall in general repeat the major portion of the disclosure of my prior application.

For an understanding of the problems and advantages of the present invention, reference may be had to so-called chocolate enrobing compositions. Here there is a specific problem in producing a chocolate enrobing composition having a suitable viscosity at a temperature at which the material can be conveniently worked. Attention must also be given to retaining a suitable viscosity for a sufficient period to facilitate commercial manipulations. It is known that viscosities can often be reduced by increasing the fat content, but in general this particular approach to the problem is not satisfactory, as those skilled in the art understand. Similar problems exist in the manufacture and use of icings wherein powdered sugar and fat usually are employed.

In the manufacture of certain other confections, such as toffees, caramels, fudges, and the like, fatty ingredients are heated at a high temperature with comminuted solids, such as sugar, in the presence of relatively small amounts of moisture, and it is necessary to have an emulsifying agent in order to maintain a stable emulsion at the high temperature. In the preparation of cooked toffee, for example, a temperature of about 285° F. is employed to reduce the moisture content of the syrup.

The principal object of the invention is to improve confections of the general character described.

Another object is the provision of a new ingredient for use in compositions of the character outlined.

Another object is to reduce the viscosity of chocolate confections of the general character indicated by the incorporation therewith of relatively small amounts of an improved addition substance.

A further object is the utilization of an improved emulsifying agent in toffees and the like which are heated to a relatively high temperature.

Other objects and features of the invention will be apparent as the detailed description thereof progresses.

I have discovered that I can produce significant improvements in the reduction of viscosities and in other ways by employing in compositions of the character outlined relatively small proportions of certain interface modifiers comprising reaction products of lipophile materials having a free hydroxy group and a derivative of phosphorus capable of forming a phosphoric acid ester, the reaction product preferably being subsequently neutralized. Some of the addition products employed are described in my co-pending application, Serial No. 705,825, filed January 8, 1934. I shall, however, describe my addition substances more in detail in a later part of the specification. It may be stated generally at this time, however, that these materials are in general modified lipins in that the reaction products contain a lipophile group and a phosphate hydrophillic group. The amount of these materials employed is of the order of ¼ to 3% on the basis of the fat used, although lesser and greater amounts can be employed if desired.

The character of improvement effected by the introduction of my interface modifiers naturally varies with the composition of matter at hand. For example, in a conventional chocolate mix, such as 148 parts of powdered sugar (6X cane sugar), 52 parts of cocoa powder (12% fat content), 100 parts of cocoa butter, and flavoring, the principal improvement is a substantial reduction in viscosity. In a conventional toffee, for example, consisting of 60 parts of cocoanut stearine, 140 parts of 4X sugar, 20 parts of invert sugar, and 20 parts of water, wherein the mix is boiled at about 285° F., and the fat must emulsify and remain emulsified at this relatively high temperature, the improvement is largely one in the case of emulsification and the stability of the emulsion obtained. In still other preparations, additional improvements are found such as in the character of texture, appearance, and/or flavor, but it is to be noted that in every instance, whatever the character of the improvement at hand, the physical chemical mechanism is one of interface modification effected by the introduction of the class of interface modifiers which I employ herein.

The interface modifiers of my invention may be described by referring to the process of making them. In general, the preparation consists preferably in reacting a more or less lipophile material with at least one free hydroxy group, for example, a diglyceride or a mixture of diglycerides with phosphorus pentoxide (or some other form or derivative of phosphorus, such as metaphosphoric acid, pyro-phosphoric acid, phosphorus trioxide, phosphorus oxychloride, phosphorus pentachloride, ethyl metaphosphate, and other phosphorus reagents capable of forming esters of phosphoric acid), to yield an ester of phosphoric acid with hydrophile properties and with strong lipophile properties. Examples A, B, C, and D, will serve to illustrate my general method for the preparation of some of the interface modifiers with the use of which the present invention is concerned.

Example A 175 parts of refined deodorized cottonseed oil are heated with 10 parts of glycerine (United States Pharmacopœia grade) in an inert, that is, non-oxidizing atmosphere, with stirring, to about 200° C. .17 parts of flaked caustic soda are then added with stirring, then raised to about 250° C. and maintained at this temperature with continuous stirring for about two hours, and cooled to room temperature in an inert atmosphere.

45 parts of the above product, which consists essentially of a mixture of diglycerides, and 3 parts of finely divided phosphorus pentoxide are mixed at a temperature of about 50° to 60° C., and then heated with vigorous stirring in a substantially dry, inert atmosphere to about 115° to 120° C., or, if desired, somewhat higher, and maintained at this temperature for two to three hours.

The reaction mixture is then allowed to remain at rest and to cool in an inert atmosphere. A small proportion of insoluble matter settles to the bottom of the container and while the mixture is still liquid, it is poured off from the sediment. The decanted material may be used as such or it is further chilled until it is semi-solid and plastic, and 50% aqueous sodium hydroxide solution is added gradually, with stirring, in sufficient proportion to render the product preferably substantially neutral to litmus, though the product may be left slightly acid or faintly alkaline to litmus. The amount of sodium hydroxide solution to be added is determined as follows:

A 2 gram sample of the material to be neutralized is dissolved in about 10 c. c. of neutral ethyl ether. 15 c. c. of neutral isopropyl alcohol are added and then 150 c. c. of distilled water are stirred in. The mixture is then titrated with $\frac{1}{10}$ normal sodium hydroxide solution, using phenolphthalein as indicator. From this titration the amount of caustic soda solution required is computed.

The product obtained consists principally of esters of phosphoric acid in the form of a light colored, pasty material with valuable interface modifying properties along the lines discussed hereinabove.

The reaction with phosphorus pentoxide described herein under Example A is susceptible to considerable variation as to the proportion of phosphorus pentoxide used, the fineness thereof, the temperature, and the duration of contact between the fatty material and the phosphorus pentoxide. In general, each of these four factors stands in reciprocal relation to the other two, that is to say, other things being equal, the greater the proportion of phosphorus pentoxide, the shorter the time of contact and/or the lower the temperature of reaction required to obtain a given result. Similarly, if the phosphorus pentoxide is relatively very finely divided, the amount thereof, the time and temperature of heating may all be reduced. Or, to state another reciprocal relation, the higher the temperature of reaction, other things being equal, the coarser may be the $P_2O_5$, the shorter the duration of contact and/or the lower the proportion of phosphorus pentoxide required to obtain a given result.

However, these reciprocal relations are valid only within certain reasonable limits. For example, while at temperatures below 105° C. some reaction does occur, it is very slow, so that to get appreciable interface modifying potency in the product, the time of contact would be so long and the proportion of phosphorus pentoxide required so high as to make such a procedure extremely inconvenient, in many instances.

On the other hand, the employment of temperatures substantially higher than 140° C. in general tends to reduce the potency of the product and discolor and char it, especially so when higher proportions of phosphorus pentoxide or longer times of contact are employed. The temperature factor is particularly important in relation to the phosphorus pentoxide reaction because of the fact that this reaction is decidedly exothermic. It is evident, therefore, that while considerable latitude is permissible in the proportion of phosphorus pentoxide, in the temperature range of the reaction, and in the time of contact of phosphorus pentoxide with fatty material, certain criteria as to the inter-relationship of these three factors must be observed to secure high interface modifying potencies in the product obtained.

Notwithstanding this, however, even though the reaction be subjected to considerable, even indiscriminate, variation in the three factors indicated, the products obtained will still possess interface modifying properties such as those described herein. To be sure, in order to obtain high or outstanding potency with respect to such interface modifying properties, those skilled in the art will appreciate the importance of carefully adjusting the conditions of the reaction, particularly with respect to the three factors designated. An illustration of such preferred conditions is carefully specified hereinabove in Example A. In all cases, however, the products obtained comprise esters of phosphoric acid interfacially active in fatty compositions falling into the class with which the present invention deals and the determinants of which are referred to at various points of this specification.

Example B

Cocoa butter is treated by the same procedure, with the same proportions successively of glycerine and phosphorus pentoxide and other materials, and under the same conditions of time, temperatures and stirring as described in Example A hereinabove. The product obtained consists primarily of esters of phosphoric acid, somewhat firmer in texture and darker in color than the product obtained in Example A, but has substantially the same interface modifying properties.

In practice I carry out my invention by taking the resultant phosphorus pentoxide reaction product of Example A and combining ½% on the basis of the fat used in the chocolate mix, together with the other ingredients, preferably by first melting the interface modifier with the fat into a homogeneous dispersion. Smaller proportions such as, for example, ¼%, of a good, potent product as in Example A, may be used to obtain reduction in viscosity and a saving in the fat in the chocolate mix. Larger proportions may be used, if desired, as high as 1% or higher, however, ½% is sufficient from a practical standpoint.

I may also disperse larger proportions of the phosphoric acid esters prepared as shown above in fats. Thus for example I may make a dispersion of 50% of the phosphoric acid reaction product with 50% of cocoa butter or hydrogenated fat or cocoanut stearine and vend same as such. A proportionate amount of this fatty composition may be used to introduce in a chocolate mix to improve the chocolate mix by reducing its viscosity at desirable temperatures, as shown by the above examples.

In place of neutralizing the reaction mixture with sodium hydroxide, I may neutralize it with other alkalis, such as for example, lime, anhydrous sodium carbonate or ammonia gas. In this case, the phosphoric acid ester of the glyceride used in this invention will not contain any nitrogen attached to carbon, but the nitrogen of the ammonia will be attached to the phosphorus through oxygen.

In Example A or Example B given above, larger percentages of phosphorus pentoxide may be used, such as 25% on the basis of the glyceride and a very good, potent product will be obtained under the conditions specified. On the other hand, as low as 1% of phosphorus pentoxide may be used to react, but higher temperatures will be necessary in order to obtain a product of some potency.

In neutralizing the ester with the sodium hydroxide solution, the resultant product will contain small amounts of moisture, from about 2% to 5%, depending upon the amount of moisture introduced by the solution of the alkali.

Example C 100 parts of oleic acid (commercially pure) of good color, odor and taste, are heated with 100 parts of glycerine (U. S. Pharmacopœia grade) to 220° C. with stirring in an inert, that is, non-oxidizing, atmosphere, and the mixture is maintained at this temperature with continuous stirring, in an inert atmosphere, for approximately two hours, until the free fatty acid content of the oil is about ½% or less. The mixture is now allowed to remain at rest and to cool in an inert atmosphere and the excess of glycerine is drawn off from the supernatant layer.

71 parts of the supernatant layer and 56½ parts of oleic acid (commercially pure) are heated with stirring at a temperature of 240° to 250° C., (substantially dry, inert gas being vigorously bubbled through the mixture simultaneously), for approximately four hours, until the free fatty acid content of the mixture is approximately ½ of 1% or less. The product is now cooled in an inert atmosphere.

100 parts of this product, which consists essentially of a mixture of diglycerides, dissolved in 300 parts of isopropyl ether, are refluxed for two hours with 25 parts of finely divided phosphorus pentoxide, care being taken to exclude moisture from contaminating the reaction mixture.

The mixture is cooled, insoluble material is filtered off, the ether is evaporated off and the product, which consists essentially of esters of phosphoric acid, may be used as such or it may be neutralized with alkaline agents such as sodium hydroxide, sodium carbonate, or the like.

Modified glycerides, for purposes of reaction with phosphorus pentoxide, in order to secure interfacially active esters of phosphoric acid for the purposes of my invention, may be obtained not only from the oils and fats mentioned in Examples A, B and C, hereinabove, but also by the methods described in the aforementioned examples and by other methods, from fatty materials such as corn oil, sesame oil, sunflower oil, lard, beef tallow, mutton tallow, hydrogenated cottonseed oils and other hydrogenated oils and fats, peanut oil, palm oil, mixed fatty acids obtained by hydrolysis of fats and oils mentioned herein, commercial stearic acid, palmitic acid, melissic acid, capryllic acid, lauric acid, myristic acid, oleic acid, cerotic acid and other fatty materials capable of reacting with glycerine and other polyhydric alcohols.

Example D 80 parts of finely divided phosphorus pentoxide are stirred into a solution of 100 parts of monostearine dissolved in 1000 parts of isopropyl ether (free of moisture and alcohol). This mixture is continually stirred and heated sufficiently under reflux condenser to maintain it substantially at the boiling point of the mixture, for two hours. The batch is now cooled to room temperature. The ether, which contains the principal portion of the reaction product in solution, is decanted from the undissolved material. The ether is distilled off and the residue is aerated to drive off the remaining small proportion of ether. The product consists essentially of esters of phosphoric acid in the form of a white, pulverizable solid with high potency with respect to the interface properties discussed hereinabove.

Many other more or less lipophile materials which have at least one unesterified hydroxy group capable of reacting with phosphorus pentoxide, may be converted into my interface modifiers by the methods described herein, particularly as in Example D, in general, by causing approximately equal weights of phosphorus pentoxide to react with the organic substance in the presence of a solvent such as isopropyl ether. Other solvents may be used and the proportion of phosphorus pentoxide is subject to considerable variation, subject to the limitations discussed at great length thereinabove. In all cases interfacially active esters of phosphoric acid possessing a lipophile group and a hydrophile phosphate group are obtained.

The physical properties of the product, such as color and consistency, depend a great deal upon the starting material. Melissyl alcohol, for example, gives a rather hard, dark phosphate ester, whereas cetyl alcohol produces a pasty material of a dark color. The solubility or dispersibility in oils and fats also varies with the relationship of the lipophile group to the hydrophile phosphate group. The more potent materials produce noticeable interfacial effects in proportions as small as ¼ to ½%. Examples of the more or less lipophile materials possessing at least one hydroxy group reactive to phosphorus pentoxide, which are suitable for the purposes of my invention, in addition to those already mentioned herein, are as follows:

Hexyl alcohol, octyl alcohol, dodecyl alcohol, myristyl alcohol, oleyl alcohol, octadecyl alcohol, ceryl alcohol, melissyl alcohol, castor oil, mono fatty acid esters of ethylene glycol, mono fatty acid esters of diethylene glycol, mono fatty acid esters of glycerine, fatty acid esters of polyglycerols with at least one hydroxy group reactive to phosphorus pentoxide, cetyl glycerol ether, lauryl ethylene glycol ether, myristyl diethylene glycol ether, other alkyl ethers with at least one hydroxy group reactive to phosphorus pentoxide, and other more or less lipophile substances with at last one hydroxy group reactive to phosphorus pentoxide. All of these materials give reaction products with phosphorus pentoxide which comprise esters of phosphoric acid having a lipophile portion and a hydrophile phosphate portion and with marked interfacial activity of the kind discussed at great length hereinabove, making them very valuable as addition agents in confections and the like.

My interface modifiers may be dried or further purified, decolorized or deodorized, or diluted by incorporation of oils or fats, or otherwise treated. The neutralization of the reaction products of my invention in general seems to impart definite improvements in potency, stability, color, consistency, etc. The unneutralized product, sometimes of a dark brown color, becomes lighter when treated with a neutralizing agent, a dark brown product usually attaining a straw color. Indeed, the color may be taken as an index in carrying out the neutralizing step. Usually the product becomes less fluid when neutralized, and is generally better suited to the purpose intended.

My interface modifiers, in addition to functioning in the manner described at length hereinabove, also have marked emulsifying properties, particularly for water in oil emulsions and in many cases, to varying extents, they possess anti-spattering functions of the kind described at great length in United States Patent No. 1,917,256. These interface modifiers disperse readily in oils, fats, waxes and other fatty materials, particularly when the temperature is properly selected with cognizance of the melting point of the interface modifier as well as the melting point of the fatty material in which it is to be distributed.

As one example of the advantages to be obtained from the use of my invention, a conventional chocolate mix may be considered. 100 c. c. of a given chocolate mix composition was found to require about 85 seconds at 43° C. to flow through a given orifice. In making a test of this character, the mix is milled warm according to the usual custom for about 15 minutes and then allowed to cool down to about 43° C., at which temperature the test is made. About ¼% of one of the materials of my invention, when added to such a mix and thoroughly dispersed therethrough, will reduce the time of flow to 45 seconds, all conditions remaining the same.

This reduction of viscosity, of course, may be taken advantage of in various ways and may also be employed for the purpose of economizing in the proportion of fat required. That is to say, a given viscosity may be obtained, other things being equal, with a substantially smaller proportion of fat ingredient.

The most desirable manner of incorporating the interface modifiers of my invention is to dissolve them in the fat content of the confection in which they are to be used. The usual fats employed are cocoa butter, so-called pressed butters, cocoanut stearine, palm kernel oil stearine, dairy butter, hydrogenated oils and other oils, fats and fatty materials.

The invention has been considered from the standpoint of reduction in viscosity, but many other improvements manifest themselves in various forms to those skilled in the art to which the invention relates. For example, the improvements effected make possible greater flexibility in enrobing temperatures; they make possible longer cooling periods, thereby permitting longer time in tunnels; greater range of working temperatures on the enrobing machine is possible; tempering is more uniform and gradual; in the cooking of toffees, by virtue of the fact that a far superior and a much more stable emulsion is obtained, the cooking is more flexible and tolerates considerably more abuse and variation than heretofore, without detrimental effects on the ultimate product; the tendency to "blooming" is considerably diminished and delayed. In many instances additional desired characteristics inure to the products concerned, by virtue of the diminished fat content.

A valuable feature of many of the products of my present invention is that they can be produced in the form of a substantially impalpable powder, and are therefore conveniently and readily incorporated into products of the character described. For example, many of the products of my invention may be sprayed into a cold atmosphere whereby the finely divided material of the spray is congealed and takes substantially a powder-like form. Still other ways of producing the substances in a convenient and desirable condition for use may be employed.

According to the present improvements, any of my reaction products produced by methods illustrated in Examples A to D, inclusive, may be increased in potency and generally improved for the purpose intended by the use of a pretreatment step prior to the formation of the ester. In this pretreatment step prior to the final esterification of the hydroxy group or groups to form the phosphoric acid ester, a lipophile hydroxy substance is treated with an agent capable of furnishing the elements of phosphorus acids or capable of forming esters of phosphorus acids, for example phosphorus pentoxide, phosphorus trioxide, or the like, the pretreatment step being carried on at a somewhat higher temperature than the temperature at which the final esterification takes place. In general, a very suitable agent for use in the pretreatment step is phosphorus pentoxide. The pretreating agent, or its altered form, preferably is removed from the reaction product by suitable means such as filtering, centrifuging and the like before the final esterification step. Marked improvement over the products of my copending application, Serial No. 710,893, results, however, even though the pretreatment agent be not removed. In general, however, if the pretreating agent be not removed before the final esterifying step, a greater amount of esterifying agent must be used and a higher temperature must be employed in the final esterification step. Even when the amount of phosphating agent is increased and a higher temperature is employed, the potency of the final material, particularly for viscosity reduction purposes, is not as great as when the pretreating agent is removed and lower temperatures and a smaller amount of phosphating agent are used in the final esterification step.

Example E

As an illustration of the process employing the pretreatment step, 600 pounds of cottonseed oil, hydrogenated to an iodine value of about 69, and 150 pounds of cottonseed oil are heated together with 250 pounds of glycerine to a temperature of about 200° F. with constant stirring and preferably in the presence of an inert atmosphere. 12 ounces of sodium hydroxide flakes are added and the temperature raised to about 485° F. and held at that temperature for about two hours with constant stirring. The inert atmosphere may be maintained and stirring accomplished by bubbling the inert gas, such as carbon dioxide, through the reaction mixture, but generally, when processing relatively large batches, mechanical stirring should be employed. In general, the product should be kept out of contact with atmospheric air at all temperatures in the region of 200° F. and above. Under the conditions given, a product consisting essentially of a mixture of mono-glycerides with some di-glycerides is produced, some free unreacted glycerine remaining. This glycerine may be removed by allowing it to settle out, by centrifuging and the like.

In the pretreatment step 700 pounds of the esterified product produced as described directly hereinabove, are transferred to a jacketed kettle. Approximately 75 pounds of finely divided phosphorus pentoxide are added at a temperature of about 160° F., thorough agitation being continuous. The temperature rises to about 200 to 210° F. Steam is then circulated in the jacket to raise the temperature to about 240° F. and the mixture is maintained at that temperature with constant agitation for one-half hour. The reaction product is then centrifuged to remove the phosphorus pentoxide and adhering organic matter. With the proportions given, about 150 pounds of a very viscous brown mass is centrifuged out. A clear liquid results from the removal of the phosphorus pentoxide and adhering organic matter and this clear liquid may then be treated further to form the phosphoric acid ester.

The clear liquid obtained from the pretreatment step is transferred back to the kettle and cooled to about 155° F. 75 pounds of finely divided phosphorus pentoxide are then added with agitation. At the same time, cold water is circulated in the jacket. The temperature rises to about 180 to 190° F. in about five to ten minutes and remains at this temperature for several minutes and then begins to cool. It is allowed to cool to about 150° F. The total time required from the time the phosphorus pentoxide is added to the time it reaches its maximum temperature and then cooled to about 150° F. is about one-half hour. This is found to give the best results when finely divided phosphorus pentoxide is used. If coarse phosphorus pentoxide is used, it is added at about 160° F. and the temperature rises slowly to 210° F. in about twenty minutes. At this point there is a tendency for the temperature to rise, but this rise is checked by circulating cool water in the jacket. The maximum temperature obtained in this way is approximately 214 to 215° F. The reaction mixture is allowed to remain at this temperature for several minutes and is then allowed to cool to about 150° F. This takes approximately another twenty minutes. A dark, reddish-brown viscous liquid is obtained.

In neutralizing the product, approximately one-half of the reaction product is removed from the kettle and the half remaining in the kettle is cooled to about 120° F. 40 pounds of finely divided anhydrous sodium carbonate are then added at one time with continuous agitation. The temperature may rise of itself as high as 165 to 170° F. over a period of about one-half hour. The cooling water should be circulated, if necessary, to avoid further rise in temperature. In most cases, the temperature will rise only to about 160° F., but some application of heat is advisable to raise the temperature to about 168° F., the temperature being maintained at this point for about one-half hour, continuous agitation being employed. During the neutralizing step, there is considerable effervescence but it is not as copious, violent or troublesome when the pretreatment step is employed as when the pretreatment step is omitted. After the product has been allowed to remain in the kettle with agitation for about one-half hour at a temperature of 168° F., it is immediately centrifuged to remove excess sodium carbonate present.

The product resulting from this example is very valuable as a viscosity reducing agent in confections, particularly of the chocolate coating type. Other improvements are imparted to the product by the pretreatment step, however, and the product is generally superior for substantially all types of confections of the general classes pointed out.

Example F 700 pounds of the esterified product produced in the first step of Example E are transferred to a jacketed kettle and approximately 75 pounds of finely divided phosphorus pentoxide are added at about 160° F. with agitation. The temperature is permitted to rise to about 200 to 210° F. and then steam is circulated in the jacket to cause a further rise in temperature to about 240° F., this temperature being maintained for one-half hour and the mixture being continually agitated. The product is then centrifuged to remove insoluble material, apparently phosphorus pentoxide with some adhering matter.

The clear liquid is transferred back to the kettle and cooled to about 155° F. 75 pounds of finely divided phosphorus pentoxide is then added with agitation, cold water at the same time being recirculated in the jacket. The temperature rises to about 180 to 190° F. in about five or ten minutes and remains at this temperature for several minutes and then begins to cool. The total time required from the time the phosphorus pentoxide is added until the product has cooled to a temperature of about 150° F. is about one-half hour. Very good results are obtained by this method when finely divided phosphorus pentoxide is employed. If coarse phosphorus pentoxide is used, the temperature is somewhat higher and the time of heating is increased.

The product produced by esterification with the fine phosphorus pentoxide may be neutralized with dry ammonia gas in the following manner:

Dry gaseous ammonia is bubbled into 300 pounds of the phosphoric acid ester, preferably in the form of fine bubbles, with vigorous stirring and with temperature control so as to maintain the entire mass at about 130° F. The time required for neutralization is somewhat longer than when sodium carbonate is employed. The ammonia is continually passed through the product until a sample portion indicates that approximately three-fourths of the ammonia required to completely neutralize the phosphoric acid ester to phenolphthalein has been absorbed.

The ammonia salt thus obtained is of a lighter color than the phosphoric acid ester from which it is prepared, and is appreciably more potent in reducing the viscosity of the chocolate compositions than the corresponding sodium salt described in Example E.

The neutralization with the ammonia gas may be carried on at a lower temperature or the time for neutralization may be decreased, if desired, by employing pressure, the ammonia gas, for example, being pumped into the phosphoric acid ester under pressure, preferably with stirring.

*Example G*

Substantially water free glycerine is polymerized, preferably with the aid of an alkali catalyst, until it has an average molecular weight corresponding to a diglycerol. 166 parts of the polymerized product, 180 parts of oleic acid, and 105 parts of stearic acid of good commercial grade are mixed together and heated to a temperature of about 220 to 225° C. and maintained at that temperature for approximately two hours, the reaction mixture in the meantime being continuously stirred. Atmospheric oxygen is kept out of contact with the mixture, preferably by maintaining an atmosphere of an inert gas at the surface, for example by bubbling carbon dioxide through the mixture continuously. The reaction should be allowed to continue until the acidity of the mixture is below 1%, the time, temperature and conditions described usually being suitable to produce this result. The product is then allowed to stand and any unreacted polyglycerol present is allowed to settle out.

To 450 parts of the mixed polyglycerol esters prepared as in the preceding paragraph, while at a temperature of approximately 60° C., 75 to 100 parts of fine phosphorus pentoxide are slowly added. A jacketed vessel may be employed to control temperature. The product is heated to approximately 120° C. and kept at that temperature for about twenty minutes. It is then removed from the vessel and centrifuged to remove insoluble materials, consisting for the most part of phosphorus pentoxide and adhering or loosely combined organic matter.

400 parts of the pretreated product are returned to the jacketed vessel and at 50° C. fifty parts of fine phosphorus pentoxide are added slowly thereto. The reaction mixture is heated to about 70° C. and the temperature then rises to about 95° C. The product is kept at this temperature for a few minutes, the total time for the entire esterification step being about twenty-five minutes.

The esterified product is neutralized suitably either by the use of sodium carbonate, as described in Example E, by the use of ammonia as described in Example F, or by employing any other suitable alkaline organic or inorganic neutralizing agent. In general, very good results are obtained if the hydrogen ions of the hydrophile phosphate group are replaced by either sodium or ammonium ions.

It should be understood that the pretreatment conditions described generally in the foregoing part of the specification and more specifically in Examples E, F, and G hereinabove may be varied as to temperature, time, proportion and kind of pretreating agent, and for each set of pretreating conditions, a corresponding potency is obtained.

In each of the examples given in which the pretreatment step is employed, the pretreating agent, apparently in a somewhat altered form, is removed by centrifuging. Other adaptable and suitable methods of removal conventionally employed in the chemical industries for separation processes may be used. Moreover, the pretreating agent, such as phosphorus pentoxide, may be allowed to remain. I have found, however, that even when phosphorus pentoxide is used for the pretreating step and also for the final esterification step, more phosphorus pentoxide is required in the esterification step if the phosphorous pentoxide used in the pretreatment step be not removed. Furthermore, a higher temperature must be employed in the final esterification step. While the resulting product may have more potency than a product produced without the use of the pretreatment step, such product, however, is not as potent by any means as the product produced when the pretreating agent is removed after the pretreating step.

Throughout this specification, I have employed the term "lipophile" to designate organic radicals with fatty characteristics. In general, such radicals consist primarily of carbon and hydrogen, although they may include ether and/or ester linkages. I have employed this term "lipophile" to denote that the radical so designated has a distinct affinity for oils, fats, waxes and other fatty materials, and imparts a tendency to the molecule of which it is a part, to be wetted by fatty materials.

I have employed the term "hydrophile" throughout this specification primarily to denote properties antithetical to the "lipophile". In counter-distinction to the "lipophile" radicals, the "hydrophile" radicals consist primarily of hydrogen and oxygen and the "hydrophile" characteristics are imparted primarily by hydroxy groups attached to carbon or phosphorus. The hydrophillic character manifests itself by an affinity for water and aqueous media, and the hydrophile radical imparts to the molecule of which it is a member, a tendency to be wetted by water and aqueous media. The degree or extent of the hydrophillic character is dependent upon the number of hydroxy groups and their location in the molecule, and is also influenced by the number and character of lipophile groups with which they are associated in the molecule.

In considering the hydrophillic phosphate group, it is understood that the hydrogen ion of the phosphate hydroxy groups may be replaced by other cations, to form salts resulting from neutralization with organic or inorganic neutralizing agents. The product made by the method involving the pretreatment step may, of course, be neutralized in the same way as the product not made with the pretreatment step. Similarly, any of the lipophile materials of the character set out having an esterifiable hydroxy group may be employed with any of the methods described or modifications thereof.

What I claim as new and desire to protect by Letters Patent of the United States is:

1. A confection composition comprising comminuted material dispersed in a fat and including a proportion of a material comprising an ester of a phosphoric acid, said material formed by pretreating a lipophile material having at least one free hydroxy group with a derivative of phosphorus capable of forming an ester of phosphoric acid, and thereafter introducing an additional amount of a derivative of phosphorus capable of forming an ester of phosphoric acid, and reacting the resulting mixture to produce an ester having a hydrophile phosphate group but devoid of nitrogen directly linked to carbon.

2. A confection composition comprising comminuted material dispersed in a fat and including a proportion of a material comprising an ester of a phosphoric acid, said material formed by pretreating a lipophile material having at least one free hydroxy group with a derivative of phosphorus capable of forming an ester of phosphoric acid, and thereafter introducing an additional amount of a derivative of phosphorus capable of forming an ester of phosphoric acid, reacting the resulting mixture to produce an ester having a hydrophile phosphate group but devoid of nitrogen directly linked to carbon, and neutralizing the resulting product.

3. A confection composition comprising comminuted material dispersed in a fat and including a proportion of a material comprising an ester of a phosphoric acid, said material formed by pretreating a lipophile material having at least one free hydroxy group with a derivative of phosphorus capable of forming an ester of phosphoric acid, removing said derivative of phosphorus, and thereafter introducing an additional amount of a derivative of phosphorus capable of forming an ester of phosphoric acid, and reacting the resulting mixture to produce an ester having a hydrophillic phosphate group but devoid of nitrogen directly linked to carbon.

4. A confection composition comprising a comminuted material dispersed in a fat and including a proportion of a material comprising an ester of a phosphoric acid, said material formed by pretreating a lipophile material having at least one free hydroxy group with a derivative of phosphorus capable of forming an ester of phosphoric acid, removing said derivative of phosphorus, and thereafter introducing an additional amount of a derivative of phosphorus capable of forming an ester of phosphoric acid, reacting the resulting mixture to produce an ester having a hydrophile phosphate group but devoid of nitrogen directly linked to carbon, and neutralizing the resulting product.

5. A confection composition comprising comminuted material dispersed in a fat and including a proportion of a material comprising an acid of a phosphoric acid, said material formed by pretreating a lipophile material having at least one free hydroxy group with a derivative of phosphorus capable of forming an ester of phosphoric acid, substantially removing insoluble material from the reaction mixture, and reacting the same with a derivative of phosphorus capable of producing a phosphoric acid ester.

6. A confection composition comprising comminuted material dispersed in a fat and including a proportion of a material comprising an ester of a phosphoric acid, said material formed by pretreating a lipophile material having at least one free hydroxy group with a derivative of phosphorus capable of forming an ester of phosphoric acid, substantially removing insoluble material from the reaction mixture, reacting the same with a derivative of phosphorus capable of producing a phosphoric acid ester, and neutralizing the resulting product.

7. A confection composition comprising comminuted material dispersed in a fat and including a proportion of a material comprising an ester of a phosphoric acid, said material formed by pretreating a lipophile material having at least one free hydroxy group with phosphorus pentoxide, and reacting the resulting material with a derivative of phosphorus capable of forming an ester of phosphoric acid.

8. A confection composition comprising comminuted material dispersed in a fat and including a proportion of a material comprising an ester of a phosphoric acid, said material formed by pretreating a lipophile material having at least one free hydroxy group with phosphorus pentoxide, reacting the resulting material with a derivative of phosphorus capable of forming an ester of phosphoric acid, and neutralizing the resulting product.

9. A confection composition comprising comminuted material dispersed in a fat and including a proportion of a material comprising an ester of a phosphoric acid, said material formed by pretreating a lipophile material having at least one free hydroxy group with phosphorus pentoxide, removing the phosphorus pentoxide, and reacting the resulting material with a derivative of phosphorus capable of forming an ester of phosphoric acid.

10. A confection composition comprising comminuted material dispersed in a fat and including a proportion of a material comprising an ester of a phosphoric acid, said material formed by pretreating a lipophile material having at least one free hydroxy group with phosphorus pentoxide, removing the phosphorus pentoxide and adhering foreign matter, and reacting the resulting material with a derivative of phosphorus capable of forming an ester of phosphoric acid.

11. A confection composition comprising a comminuted material including sugar dispersed in a fat and having included therein a higher molecular weight ester of phosphoric acid with a lipophile radical and at least one hydrophile phosphate group, prepared by pretreating a lipophile material having at least one free hydroxy group with phosphorus pentoxide before the formation of the phosphoric acid ester and reacting the resulting product with a substance capable of forming an ester of phosphoric acid.

12. A confection including fat, sugar and an ester of phosphoric acid formed by a process including pretreating a lipophile material having at least one free hydroxy group with phosphorus pentoxide, and thereafter reacting the pretreated material with phosphorus pentoxide to form an ester of phosphoric acid having a hydrophile phosphate group.

13. A confection including fat, sugar and an ester of phosphoric acid formed by a process including pretreating a lipophile material having at least one free hydroxy group with phosphorus pentoxide, and thereafter reacting the pretreated material with phosphorus pentoxide to form an ester of phosphoric acid having a hydrophile phosphate group, and neutralizing the resulting product with ammonia.

14. The method of improving confections of a class including a fat with comminuted material dispersed therein, which comprises pretreating a lipophile material having at least one free hydroxy group with a derivative of phosphorus capable of producing an ester of phosphoric acid, reacting the pretreated material with a derivative of phosphorus capable of forming an ester of phosphoric acid, and dispersing a proportion of the resulting material in the confection.

15. The method of improving confections of a class including a fat with comminuted material dispersed therein, which comprises pretreating a lipophile material having at least one free hydroxy group with phosphorus pentoxide, reacting the pretreated material with a derivative of phosphorus capable of forming an ester of phosphoric acid under conditions to produce an ester having a hydrophillic phosphate group, and dispersing a proportion of the resulting ester in said confection.

16. The method of improving confections of a class including a fat and a sugar, which comprises pretreating a lipophile material having at least one free hydroxy group with phosphorus pentoxide, removing the phosphorus pentoxide, reacting said material with a derivative of phosphorus pentoxide, neutralizing the resulting product with ammonia, and dispersing a proportion of the neutralized product in said confection.

17. The method of improving compositions of matter of a class consisting of chocolate-like coatings for confections, including candy creams, cookies and ice cream, chocolate confections, icings, fillings, fudges, butter creams, caramels and toffees, which comprises dispersing in said compositions a proportion of an ester of phosphoric acid in the form of a reaction product of phosphorus pentoxide and a lipophile molecule with at least one hydroxy group reactive to phosphorus pentoxide, and in which the esterified phosphate group is hydrophillic in character, and neutralizing said phosphate group, said ester being formed by first pretreating said lipophile molecule with phosphorus pentoxide, and then reacting the resulting pretreated product with phosphorus pentoxide to form the ester.

18. A confection composition comprising comminuted material dispersed in a fat and including an ester of phosphoric acid having lipophile and hydrophile phosphate groups and prepared by pretreating a product comprising glycerin partially esterfied with a high molecular weight fatty acid, with a derivative of phosphorus capable of forming an ester of phosphoric acid, and subsequently introducing an additional amount of a derivative of phosphorus capable of forming an ester of phosphoric acid, and reacting the resulting mixture to produce a phosphoric acid ester devoid of nitrogen linked directly to carbon.

19. A confection composition comprising comminuted material dispersed in a fat and including an ester of phosphoric acid having lipophile and hydrophile groups prepared by pretreating a liquid vegetable oil fatty acid ester of glycerine with at least one free hydroxy group with a derivative of phosphorus capable of forming an ester of phosphoric acid, subsequently introducing an additional amount of a derivative of phosphorus capable of forming an ester of phosphoric acid and reacting the resulting mixture to produce an ester devoid of nitrogen linked directly to carbon.

20. A confection composition comprising comminuted material dispersed in a fat and having including therein a phosphoric acid ester with lipophile and hydrophile groups, said ester prepared by treating glycerin partially esterified with a high molecular weight unsaturated fatty acid, with a derivative of phosphorus capable of forming an ester of phosphoric acid, and thereafter reacting the resulting product with a derivative of phosphorus capable of forming an ester of phosphoric to form a non-nitrogenous phosphoric acid ester.

21. A chocolate composition comprising sugar, chocolate and fat and a non-nitrogenous phosphoric acid ester having lipophile and hydrophile groups, said ester prepared by pretreating with a derivative of phosphorus capable of forming an ester of phosphoric acid, a higher fatty acid ester of glycerin with at least one free glycerine hydroxy group, and then reacting the resulting pretreated product with a derivative of phosphorus capable of forming an ester of phosphoric acid.

22. A chocolate composition comprising sugar, chocolate and fat and a non-nitrogenous phosphoric acid ester having lipophile and hydrophile groups, said ester prepared by pretreating with a derivative of phosphorus capable of forming an ester of phosphoric acid, an unsaturated higher fatty acid ester of glycerin with at least one free glycerin hydroxy group, and then reacting the resulting pretreated product with a derivative of phosphorus capable of forming an ester of phosphoric acid.

23. A confection composition comprising comminuted material dispersed in a fat and including an ester of phosphoric acid having lipophile and hydrophile phosphate groups prepared by pretreating with phosphorus pentoxide a higher fatty acid ester of glycerine having at least one free glycerine hydroxy group, removing the phosphorus pentoxide and adhering organic matter, reacting the resulting pretreated product with phosphorus pentoxide, and treating the reacted product with a neutralizing agent to decrease the acidity of the ester.

BENJAMIN R. HARRIS.